A. F. ANGELICOLA.
BRAKE FOR VESSELS.
APPLICATION FILED AUG. 6, 1912.
1,069,996.
Patented Aug. 12, 1913.
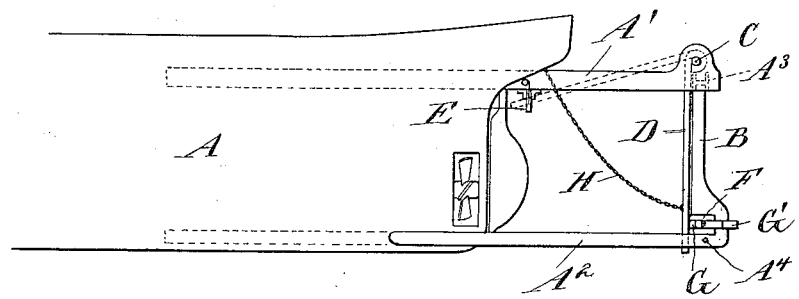
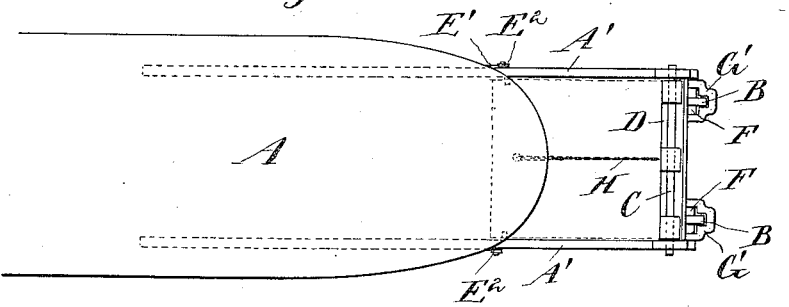
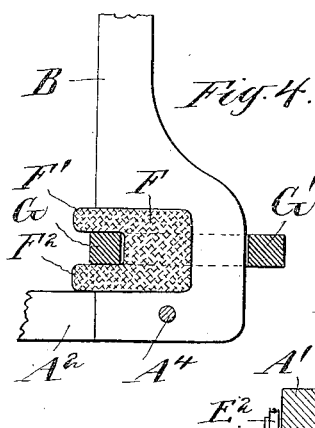
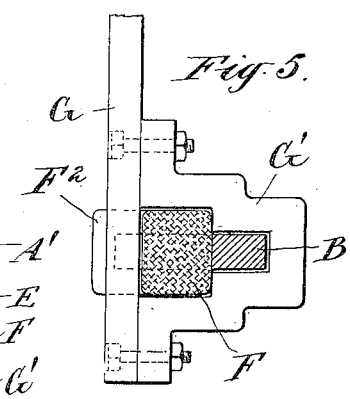
Witnesses:
R. T. Eddowes.
L. H. Wilshusen.
Inventor:
Achilles F. Angelicola,
by his attorney,
Charles R. Searle.

UNITED STATES PATENT OFFICE.

ACHILLES F. ANGELICOLA, OF PATERSON, NEW JERSEY, ASSIGNOR OF ONE-THIRD TO PHILIP RAPPOPORT, OF PATERSON, NEW JERSEY.

BRAKE FOR VESSELS.

1,069,996. Specification of Letters Patent. Patented Aug. 12, 1913.

Application filed August 6, 1912. Serial No. 713,554.

*To all whom it may concern:*

Be it known that I, ACHILLES F. ANGELICOLA, a citizen of the United States, residing at Paterson, in the county of Passaic and State of New Jersey, have invented a certain new and useful Improvement in Brakes for Vessels, of which the following is a specification.

The invention relates to means for stopping a vessel, and the object of the invention is to provide an easily operated and efficient emergency device ready for instant service, in the form of an apron of large area adapted to enter the water and act as a drag by which the movement of the vessel may be quickly retarded and danger of collision greatly lessened.

Another important object is to provide cushioning means whereby the shock and strains due to the sudden engagement of the apron in the water are successfully resisted.

The invention consists in certain novel features and details of construction and arrangement by which the above objects are attained, to be hereinafter described.

The accompanying drawings form a part of this specification and show an approved form of the invention.

Figure 1 is a side view of the rear portion of a vessel equipped with the improved brake device. Fig. 2 is a corresponding plan view, and Fig. 3 is a rear elevation of the same. The remaining figures are on a larger scale and show details of the mechanism. Fig. 4 is a vertical section, partly in elevation, showing the cushioning means. Fig. 5 is a corresponding plan view partly in horizontal section. Fig. 6 is an elevation partly in vertical section, showing a simple releasing device for dropping the apron.

Similar letters of reference indicate the same parts in all the figures.

A is the hull of a vessel and $A^1 A^1$ are rearward extensions or continuations of the longitudinal frame above the water line, and $A^2 A^2$ are similar extensions located below the water line, and comprising with the vertical connecting bars B B an overhanging frame projecting rearwardly from the stern.

In suitable housings or bearings at the extreme rear ends of the upper members $A^1 A^1$ is mounted a shaft C supporting an apron or plate D arranged to be held normally in an approximately horizontal position above the water, and when required for service in stopping the vessel, to be dropped and held vertically with a large portion of its area immersed and acting as a drag on the vessel.

The apron may be supported between the upper members $A^1 A^1$ by any suitable releasing means; in the simple form shown in the drawings, two swinging hooks E E are employed, adapted to engage automatically the margins of the apron when the latter is raised, and to be drawn out of such engagement by lines $E^1 E^1$ attached to the hooks and running over suitably arranged pulleys $E^2 E^2$ in the hull of the vessel.

The disposition of the members $A^1 A^1$ and $A^2 A^2$ in relation to the vessel is such as to distribute to advantage the strains due to the sudden immersion of the plate while the vessel is in motion. And to soften the initial shock of the contact of the apron against the frame-members, buffers or cushions F are carried by the latter to receive the impact at the lower margin of the apron. These buffers are preferably of knitted or braided rope similar to the cylindrical fenders commonly employed on vessels but each is formed with two extensions $F^1 F^2$ with a space between them receiving a bar G extending transversely within the frame, and the vertical members B B are each provided with a notch or recess to receive the body of the buffer as shown. A yoke $G^1$ at each end of the bar G incloses the body of the buffer and also the adjacent portion of the vertical member B and thus holds the buffer in position with its extensions $F^1 F^2$ presented to the action of the apron. The buffers, bar, and vertical members are so constructed and arranged relatively to each other as to cause the first contact of the apron to be received on the projecting ends of the buffer extensions $F^1 F^2$ which on yielding to the pressure permit the strain to be received upon the transverse bar G lying normally a little in advance of the vertical members B B and backed up by the body of the buffer. As the buffer yields under pressure on the bar, the latter recedes to the plane of the inner faces of the vertical members, and the apron comes to rest against such vertical members in opposition to the elasticity of the buffer. The yokes $G^1 G^1$ permit the above described movement of the bar G without releasing the buffers.

The rear ends of the upper members A¹ A¹ are joined by a transverse beam A³ to which the upper ends of vertical members B B are secured, and the ends of the lower members A² A² are connected by a tie A⁴. The beam A³ is preferably of H-section located below the shaft C with one plane face in such relation to the shaft as to receive the upper margin of the apron when the latter is in service and relieve the shaft from strain.

Any preferred means may be employed for raising the apron. I have shown a single chain H attached to the inner face of the apron and extended to the interior of the hull, by which the apron may be lifted to a level at which it will be automatically engaged and held by the hooks E E. Thus equipped the advance of the vessel may be quickly checked by dropping the apron, and the dangers of collision very greatly reduced.

Modifications may be made in the forms and locations of the parts without departing from the invention. Any suitable electrically or mechanically operated releasing gear may be substituted for the simple swinging hooks E E; and other cushioning devices may be employed in place of the buffers F F, or in the case of launches or other small vessels the buffers may be omitted.

Although the apron is shown as a single plate of metal, and for small vessels it may be in this form, it will be understood that for large ships the apron will be built of plates or sections properly connected to form a unitary whole, and reinforced by ribs or other strengthening means to impart the required stiffness.

I claim:—

1. In a device of the character set forth, a frame fixedly projecting from the stern of a vessel, an apron hinged at its upper edge in said frame, means for holding said apron above the water and extended from such hinge toward the vessel, and for releasing said apron for immersion when required, and an abutment in said frame against which the lower edge of said apron engages when released and swung downwardly and outwardly from the vessel.

2. In a device of the character set forth, a frame fixedly projecting from the stern of the vessel, an apron hinged at its upper edge in said frame, means on said frame for holding said apron above the water and for releasing it for immersion when required, and cushioning means arranged to soften the impact of the free end of said apron.

3. In a device of the character set forth, a frame fixedly projecting from the stern of the vessel, an apron hinged at its upper edge in said frame, means for holding said apron above the water and for releasing it for immersion when required, and a yielding abutment mounted in said frame and arranged to receive the impact of said apron when the latter is released for immersion.

4. In a device of the character set forth, a frame comprising upper members above the water line and members below the water line, said members extended longitudinally of the vessel at the stern thereof, a shaft mounted on said upper members, an apron on said shaft, movable means for supporting the free end of said apron in an approximately horizontal position in said frame, and for releasing said free end when required, vertical frame-members connecting said longitudinal members, and buffers in said vertical members for receiving the impact of such free end when said apron is released for immersion.

5. In a device of the character set forth, a frame comprising a pair of upper members above the water line and a pair of members below the water line, said members extended longitudinally of the vessel at the stern thereof, a shaft mounted on said upper members, an apron on said shaft, means for supporting and releasing the free end of said apron, vertical frame-members connecting said longitudinal members and having recesses therein, a bifurcated buffer received in each of such recesses, a bar extended transversely of said frame members and received between the bifurcations of said buffers, and yokes on said bar inclosing said vertical members and serving with the latter and said bar to engage said buffers loosely and permit their gradual compression under the impact of the free end of said apron when released for immersion.

In testimony that I claim the invention above set forth I affix my signature, in presence of two witnesses.

ACHILLES F. ANGELICOLA.

Witnesses:
CHARLES R. SEARLE,
HELEN V. RICE.

Copies of this patent may be obtained for five cents each, by addressing the "Commissioner of Patents. Washington, D. C."